Feb. 27, 1962 A. L. JOHNSON 3,023,295
ELECTRIC SOLDERING IRON OF THE INSTANT HEAT TYPE
Filed July 30, 1958 2 Sheets-Sheet 1

INVENTOR.
Arthur L. Johnson,
BY Richards and Cifelli,
Attorneys

Feb. 27, 1962  A. L. JOHNSON  3,023,295
ELECTRIC SOLDERING IRON OF THE INSTANT HEAT TYPE
Filed July 30, 1958  2 Sheets-Sheet 2
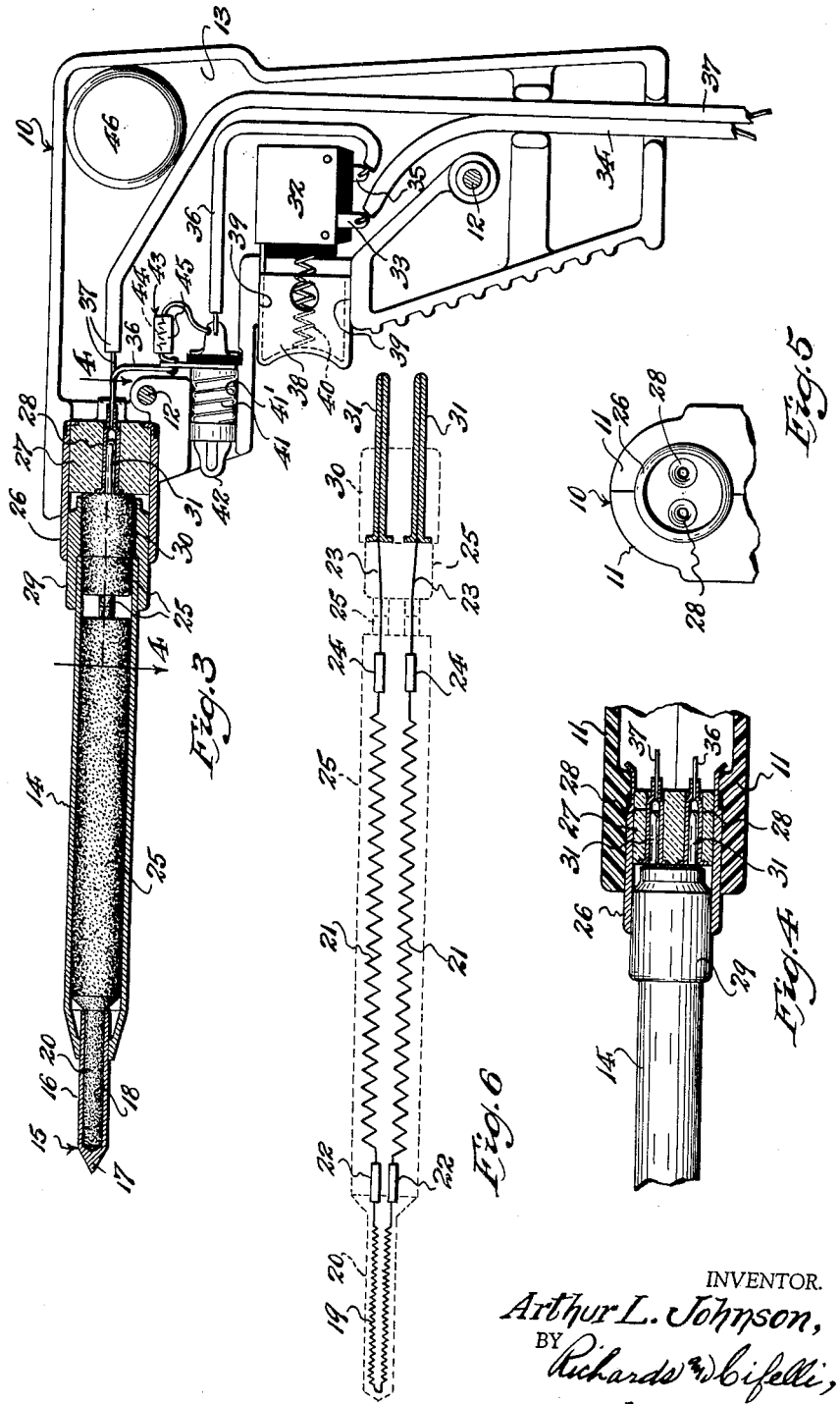
INVENTOR.
Arthur L. Johnson,
BY Richards & Cifelli,
Attorneys

United States Patent Office 3,023,295
Patented Feb. 27, 1962

3,023,295
ELECTRIC SOLDERING IRON OF THE
INSTANT HEAT TYPE
Arthur L. Johnson, Roselle Park, N.J., assignor to Hexacon Electric Company, Roselle Park, N.J., a firm
Filed July 30, 1958, Ser. No. 752,049
2 Claims. (Cl. 219—26)

This invention relates to electric soldering irons, and has reference more particularly, to electric soldering irons of the kind known to the art as of the "instant heat" type, i.e. one which reaches soldering temperature within a few seconds after it is electrically energized; such soldering irons ordinarily have the form of a gun provided with a trigger actuated switch for controlling delivery of energizing electrical current to its heating elements.

Heretofore quick heating gun form electric soldering irons of the so-called instant heat type have necessitated the inclusion of either a built in transformer or a thermostat for electrical energy control.

Although transformer equipped electric soldering irons will attain instant heat effect, the presence of the transformer greatly increases the bulk and weight of the iron (the weight ordinarily being of the order of 40 ounces or more), with the consequence that use thereof involves rapid operator fatigue, and its relatively considerable bulk interferes with practical and convenient use, when application thereof to confined soldering locations is required. Furthermore, transformer equipped irons can only be operated by 60 cycle A.C. Other disadvantages of transformer equipped irons are that the same of necessity require soldering tips made of comparatively fragile thin copper wire or other soft metal of good conductivity, and of smaller cross-section than the electrodes from which they extend, in order to become hot enough to solder. Such soldering tips tend to soften when heated, and thereupon bend out of shape. Furthermore, the connections between such soldering tips and the electrodes from which they extend tend to quickly oxidize, and consequently the same require very frequent cleaning. The amalgamation of the copper or other metal of the tip with the tin in the solder induces rapid wear, which necessitates frequent tip replacement. Oxidation at the connections of the tip with the electrodes impairs efficient conduction of energizing electric current to the tip, and thus reduces effective soldering heat at said tip, thereby rendering soldering performance irregular. In addition to this, the tip cools very quickly because it is so thin, and consequently the tip has little ability to retain reserve heat. A further disadvantage of a transformer equipped electric soldering iron is that the same cannot be safely used in or near electrical apparatus such as sensitive electrical measuring meters and the like, since it sets up a strong magnetic field that not only interferes with accurate indication of such meters, but also risks actual damage to the same.

With respect to thermostatically controlled electric soldering irons, the disadvantages thereof are that the same do not reach soldering temperature with desired rapidity or speed, and the theromstatic elements tend to constantly get out of order and have but limited useful life. Furthermore, the thermostatic elements, in operation, tend to interfere with radio and radar operation and reception in the vicinity where use of the soldering iron is required.

Having the above in view, it is an object of this invention to provide an electric soldering iron of the "instant heat" type, and preferably of gun form, which avoids the above referred to disadvantages of either the transformer equipped or the thermostat equipped irons of the prior art. To this end, the invention provides an iron of relatively light weight, e.g. about 8 ounches, the same being equipped with a novel soldering tip enclosing an electrical heating element, said element being served by novel electrical circuit elements including ballast coils and a trigger manipulatable switch, whereby the wattage delivered to the heating element can be easily controlled, and the soldering temperature of the tip regulated, thus permitting a wide range of work to be done from light to heavy soldering, and whereby in a matter of a few seconds, the tip temperature can be made to fluctuate from a minimum of about 400° F., at which the tip will barely melt solder, to a maximum as high as 1200° F., so that the particular heat at any time can be easily obtained without overheating, thus assuring a long useful life of the tip heating element.

A further object of this invention is to provide a novel tip heating element and electrical energy delivery and control means therefor which can be operated by either D.C. or A.C. energy on any cycle, said delivery and control means including ballast coils, in series with the heating element, said ballast coils being of such character as to possess a positive coefficient of resistivity, and thus being adapted to act as an automatic heat valve.

Another object of this invention is to provide a soldering tip of conventional shape made of a suitable metal capable of high heat conductivity, said tip preferably comprising unalloyed or pure iron, with respect to which there is no amalgamation therewith of tin constituent of solder; which, because of its hard character, will not pit or corrode; which is rigid and non-deformable by heat; which is permanently secured to the shank of the iron and not in circuit with the electrical system of the iron, so that no oxidation is involved; which is well adapted to retain heat in reserve; and which provides long life use without necessity for frequent replacement.

A further object of this invention is to provide, in series with the tip heating electric circuit and control elements of the iron, a low voltage incandescent lamp for illuminating the work area to which the iron is applied in use, and means for so connecting the lamp in circuit that a constant selected voltage is applied thereto, notwithstanding variation of voltage delivered to the heating element during use of the iron.

The above and other objects will become apparent from a reading of the following description of an illustrative embodiment of this invention in connection with the accompanying drawings, in which:

FIG. 1 is a side elevational view of an electric soldering iron embodying the principles of this invention; and FIG. 2 is an end elevational view of the same, viewed from the left in FIG. 1.

FIG. 3 is a side elevational view in part section, with a side of the hand grip or handle removed to show internal parts housed therein, this view being drawn on an enlarged scale; FIG. 4 is a fragmentary longitudinal sectional and side elevational view, taken on line 4—4 in FIG. 3; and FIG. 5 is a fragmentary front end elevational view of the hand grip or handle of the iron, with the shank and its soldering tip removed.

FIG. 6 is a diagrammatic view of the solder tip heating element and associated ballast coils.

Figure 1:
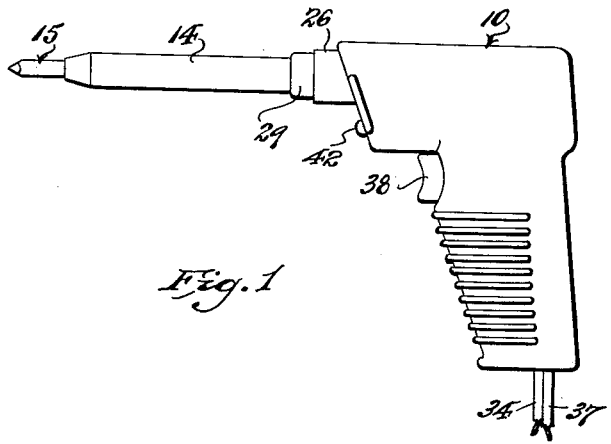
Figure 2:
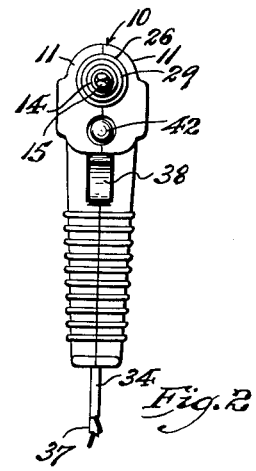
Figure 7:
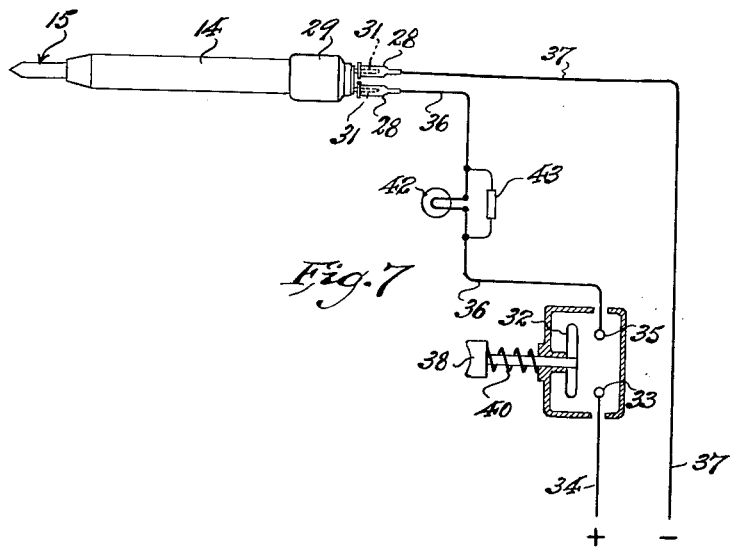
FIG. 7 is a wiring diagram of the electrical circuit system of the soldering iron.

Referring to the drawings, in which like characters of reference denote corresponding parts, the reference character 10 indicates the hollow hand grip or handle member of the soldering iron, the same being preferably of pistol grip design or formation. Said hand grip or handle member is divided longitudinally to form meeting separable side sections or parts 11, which are adapted to be suitably fastened together, as by transverse screws or bolts 12, and as thus assembled to provide an internal chamber 13. Although said hand grip or handle member may be made of any suitable material, it preferably comprises a plastic material of light weight.

Extending outwardly from the forward end of the hand grip or handle member is a, preferably metallic, tubular shank member 14, to the outer end of which is affixed, as by brazing the same thereto, a hollow soldering tip 15, such as hereinafter more particularly described. Within this shank member and tip are disposed the electrically energized tip heating means according to this invention, and within the hand grip or handle member are disposed means for manually controlling delivery of electrical energy to said tip heating means.

The soldering tip element 15 is made of a metal possessing the characteristic of high heat conductivity, and preferably of pure or unalloyed iron. Said tip element is formed to provide a rearwardly, open, thin walled hollow body 16, which is closed at its outer end by a conical or otherwise suitably shaped free end portion 17, thus providing an internal chamber 18 within which is housed an electrical heating element 19. This heating element 19 comprises a looped helically coiled wire of high resistance metal, such as a nickel-chromium alloy. The heating element 19 is enclosed in a body 20 of electrical insulative but good heat conductive material, such as porcelain or the like, which body 20 fills the chamber 18 contiguous to the thin walls thereof and to the tip end portion 17. Connected with the respective terminals of the heating element 19, to extend rearwardly therefrom through the shank member 14, are a pair of ballast coils 21 comprising wire of metallic alloy having a positive coefficient of resistivity, whereby to function as subsequently herein described. The adjoined terminals of said heating element 19 and ballast coils 21 are electrically and mechanically coupled by electrically conductive coupler members 22 brazed or otherwise fixedly attached thereto, whereby to provide sealed jointures which preclude local oxidation. Conductive wire leads 23 extend from the opposite or rearward terminals of the respective ballast coils 21, to which leads electrical energy delivery means can be connected. Said wire leads 23 are also electrically and mechanically coupled to the rearward terminals of said ballast coils 21 by enveloping conductive metallic coupling members 24, which are brazed or otherwise fixedly attached thereto. The ballast coils 21 and the leads 23 are also enclosed in suitable electrical insulating material, such as porcelain or like sleeves or bodies 25, thus likewise precluding oxidation at said coupling connections.

The shank member 14, soldering tip and heating means assembly may be non-detachably connected with the hand grip or handle member, but is preferably detachably connected therewith. In the latter case, the hand grip or handle member 10 is provided, at its forward end portion, with an outwardly open tubular socket member 26 suitably affixed thereto. Secured within the rearward end portion of this socket member is a receptacle or outlet member 27 made of electrically insulative material, such as porcelain. Mounted in said receptacle or outlet member 27 are a pair of female contact elements 28. Affixed to the shank member 14, at its rearward end, is a coupler ferrule 29, which is adapted to be removably entered into the socket member 26, whereby to operatively but detachably couple the shank member 14 to the hand grip or handle member 10. Secured within the coupler ferrule 29 is a supporting body 30 made of electrically insulative material, such as porcelain. Mounted in said supporting body 30 are a pair of male contact elements or prongs 31 having free end portions projecting outwardly and rearwardly therefrom. The leads 23 of the soldering tip heating means are electrically connected with said male contact elements or prongs 31. When the shank member, soldering tip and tip heating means assembly is coupled to the hand grip or handle member 10, said male contact elements or prongs 31 will enter the female contact elements 28, so as to electrically connect the soldering tip heating means to means for controlling delivery of electrical energy thereto, said latter means being connected in circuit with said female contact elements 28.

The means for manually controlling delivery of electrical energy to the soldering tip heating means includes a switch 32, which is suitably located and supported within the chamber 13 provided by the hollow hand grip or handle member 10. To one pole 33 of said switch is connected a conductor 34 which leads from a suitable source of electrical energy, and is entered into the hand grip or handle member interior. The other pole 35 of the switch 32 is connected by a conductor 36 to one of the female contact elements 28. Connected with the other of said female contact elements 28 is a conductor 37 which extends through and outwardly from the hand grip or handle member 10 back to the source of electrical energy, thus completing the service circuit for the soldering iron.

A manipulatable trigger member 38 is provided for actuating the switch 32. The hand grip or handle member 10 is provided, at its hand grip portion, with an outwardly and forwardly open slideway 39 to support the trigger member in outward projection therefrom. The trigger member is outwardly urged by spring means 40 to switch opening position.

In the operation of the electric soldering iron of this invention, when the trigger member 38 is manually moved inward, by a finger of the operator's hand by which the hand grip or handle member is grasped, to close the switch 32, energizing electric current is delivered so as to flow through the soldering tip heating means. The flow of current through the heating element 19 generates heat which is very rapidly transferred to the soldering tip 15, whereby to bring the latter to soldering temperature in a few seconds after the switch 32 is closed. By on and off manipulation of the switch 32, the soldering tip temperature can be made to fluctuate from about 400° F. to its highest temperature approximating 1200° F., and by such manipulation of the switch the soldering tip temperature can be controlled at any selected degree within this range. By reason of the inclusion of the ballast coils 21 in the circuit of the soldering tip heating element, even though the switch 32 is held closed longer than necessary, overheating of the soldering tip is guarded against, since said ballast coils, being of character possessing a positive coefficient of resistivity, when current passes though said ballast coils the same will heat up so that the resistance thereto increases, with the result that less wattage is delivered to the heating element 19, and consequently its temperature and that of the soldering tip is reduced. Due to this, said ballast coils 21 will function as an automatic heat valve. Since the ballast coils cool rapidly, when the switch 32 is opened and current flow through said ballast coils is interrupted, the ballast coils quickly regain normal conductivity when current flow therethrough is resumed, and consequently maximum wattage will again be delivered to the heating element, and temperature of the soldering tip will rise. From the above it will be understood that the combination of the trigger manipulatable switch and the ballast coils allows for a more flexible variation and control of the soldering tip temperature, whereby substantially the exact heat required to obtain a reliable soldered joint can be maintained without risk of overheating, and so that the operative life of the heating element 19 is conserved and extended.

Due to the rapid heating and easily controlled working temperature, the soldering iron of this invention is capable, in operation, of producing from 20 to 30 soldered joints before an ordinary electric soldering iron heats up to a usable condition.

By reason of the light weight of the soldering iron of this invention, due to the elimination of necessity for transformer inclusion, the same can be used over long uninterrupted periods of time with minimum risk of operator fatigue. Also because of elimination of transformer inclusion, the soldering iron of this invention can be operated by either direct or alternating current on any cycle.

Since the soldering iron of this invention is provided with a rigid non-deformable soldering tip, preferably composed of unalloyed or pure iron, and is not subjected to electric current flow therethrough, there is no amalgamation therewith of tin contained in solder, or of accumulation of other surface residue, likely to impair its efficient soldering performance. Furthermore, since a soldering tip of such character which is highly resistant to pitting or corrosion, its useful life is greatly prolonged, and, under ordinary conditions of use, will last indefinitely, remaining like new after even years of service. This is in marked contrast to fragile copper wire soldering tips, usually required in transformer equipped soldering irons, and which ordinarily require replacement after but few hours of use. Again, since the soldering tip according to this invention is permanently affixed to the shank of the iron, as by brazing, and since no flow of electric current therethrough is involved, risk of oxidation is avoided, so that frequent cleaning is not required, nor is the soldering effect thereof impaired because of oxidation likely to cause reduction of soldering heat and consequent irregular soldering performance.

By reason of the fact that the heating element 19 is located entirely within the soldering tip 15, and close to the working end of the latter, and due to the thin wall of the tip body, which is but a few thousandths of an inch in thickness, rapid transfer of heat thereto is assured, and therefore exceedingly rapid heating to desired soldering temperature is possible; furthermore, the soldering tip tends to retain heat, and therefore provides more reserve heat which improves its efficiency in soldering use. Also, being rigid and non-deformable, the soldering tip of this invention is similar to that of a conventional soldering iron, and therefore more practical in use.

In electric soldering irons of the gun type especially, it is often desirable that means be included for illuminating the working area to which its soldering operation is applied. To this end, an incandescent electric lamp as a light source can be used, but difficulties of including the same in the soldering iron have been encountered, and supply of activating electric current thereto has usually required circuit arrangements independent of the circuit of the soldering tip heating means. According to this invention such electric lamp can be connected in series with the soldering tip heating means. As shown more particularly in FIG. 3, the hand grip or handle member is provided with an opening 41¹ located intermediate the switch actuating trigger 38 and the shank member 14. Within this opening 41¹ is mounted a forwardly open lamp socket 41, into which an incandescent lamp 42 can be entered, whereby the lamp is adapted to outwardly project its light parallel to the shank member 14, and thus upon the work area to which the soldering iron is applied in use. The lamp socket 41 is connected or cut into the branch conductor 36. Connected in shunt with the lamp socket is a resistance element 43, comprising a wire resistor coil 44 possessing a positive coefficient of resistivity, whereby is delivered through the socket to the lamp a constant selected voltage (e.g. 2 volts) sufficient to activate the lamp. Said resistance element 43 is enclosed in ceramic material 45, the mass of which is so proportioned that the heat loss from the resistance element 43 to the atmosphere is at a minimum, whereby the resistance element 43 acts in correspondence to the action of the ballast coils 21 of the soldering tip heating means, and consequently will govern application of constant selected voltage to the lamp 42, regardless of total voltage delivered to said soldering tip heating means.

If desired a weight 46 can be mounted within the upper rear interior of the hand grip or handle member 10, whereby to counterbalance to some extent the weight of the projecting shank member, soldering tip and heating means assembly, thus further facilitating operative manipulation of the soldering iron without undue fatigue.

It will be understood that variations and modifications of the elements comprising the system and construction of the soldering iron of this invention may be made within the scope of the appended claims.

Having now described my invention, I claim:

1. In an electric soldering iron of the type having a tubular shank terminating in a hollow soldering tip in which is enclosed a heating element formed by helically coiled high resistance wire, to which heating element are connected ballast coils of wire having a positive coefficient of resistivity disposed to extend rearwardly through the shank, the combination therewith of a hollow handle member of the pistol grip type to support said shank and soldering tip in outward projection therefrom, means to mechanically and electrically detachably connect said shank and its soldering tip, heating element and ballast coil assembly to the hollow handle member, said handle member having a hand grip portion, electrical conductors entered in the handle member through said hand grip portion thereof and detachably connected to said ballast coils to supply operating current from a source of electrical energy to the ballast coils and heating element, a switch mounted within said hand grip portion of the handle member and connected in the circuit of said electrical conductors, a spring released finger manipulatable trigger supported in connection with the hand grip portion of the handle member and operative by finger applied pressure to close said switch, whereby manipulated closing and opening of the switch controls delivery of operating current to the ballast coils and heating element, an electric lamp socket and bulb mounted in connection with the front of the hand grip port of the handle member, said socket being connected in shunt circuit with the electrical energy supply conductors in series with the switch, ballast coils and heating element, and said shunt circuit including a resistance coil having a positive coefficient of resistivity, whereby, when the switch is closed, to energize the lamp bulb by delivery thereto of a constant selected actuating voltage.

2. In an electric soldering iron according to claim 1, wherein said heating element and ballast coils are enclosed in insulating material of good heat conductive character, and the terminals of the electrical current conductors and the terminals of the ballast coils are respectively separatively joined and sealed by separable male and female metallic coupler elements respectively brazed thereto.

References Cited in the file of this patent

UNITED STATES PATENTS

| 171,941 | Lang | Jan. 11, 1876 |
|---|---|---|
| 497,793 | Jenkins | May 23, 1893 |
| 563,715 | Grutting | July 7, 1896 |
| 915,974 | Leonard | Mar. 23, 1909 |
| 922,410 | Feldman | May 10, 1909 |
| 1,279,321 | Gardner | Sept. 17, 1918 |
| 1,993,781 | Hampton et al. | Mar. 12, 1935 |
| 2,198,877 | Kuhn et al. | Apr. 30, 1940 |
| 2,224,583 | Abbot | Dec. 10, 1940 |
| 2,667,561 | Schoenwald | Jan. 26, 1954 |
| 2,715,669 | Dicke | Aug. 16, 1955 |
| 2,745,939 | Lenk | May 15, 1956 |
| 2,751,484 | Moon | June 19, 1956 |

FOREIGN PATENTS

| 657,147 | Great Britain | Sept. 12, 1951 |
|---|---|---|
| 556,609 | Great Britain | Oct. 13, 1943 |